United States Patent [19]

Kaufman

[11] 4,200,536

[45] Apr. 29, 1980

[54] UNDERDRAIN FOR FILTER TANKS

[76] Inventor: Samuel Kaufman, 860 Pennsylvania Ave., Hagerstown, Md. 21740

[21] Appl. No.: 935,859

[22] Filed: Aug. 22, 1978

[51] Int. Cl.² ............................................ B01D 23/20
[52] U.S. Cl. .................................. 210/279; 210/289; 210/291
[58] Field of Search ................ 210/275, 279, 289, 291

[56] References Cited

U.S. PATENT DOCUMENTS

| | | | |
|---|---|---|---|
| 949,455 | 2/1910 | Usher | 210/279 |
| 1,698,079 | 1/1929 | Wagner | 210/275 |
| 2,242,652 | 5/1941 | Maxwell | 210/5 |
| 2,364,775 | 12/1944 | Brice | 210/291 |
| 2,818,977 | 1/1958 | Crist | 210/291 |
| 3,247,971 | 4/1966 | Kastler | 210/291 |
| 3,384,240 | 5/1968 | Berardi | 210/279 |
| 3,954,620 | 5/1976 | Nebolsine | 210/275 |

*Primary Examiner*—Thomas G. Wyse
*Assistant Examiner*—Ivars Cintins
*Attorney, Agent, or Firm*—Watson, Cole, Grindle & Watson

[57] ABSTRACT

An underdrain assembly for a filter tank includes a plurality of spirally shaped hollow tubular elements of substantially equal length having capped terminal ends and equally spaced perforations in lower sides thereof. The elements are equally spaced apart so that the perforations in adjacent elements are spaced substantially the same as the perforations in the tubular elements. Backwash water fed out through such perforations is therefore distributed during a backwashing operation substantially uniformly throughout the filter bed of the tank overlying the underdrain assembly so that the entirety of the filter bed is completely and uniformly backwashed.

2 Claims, 5 Drawing Figures

U.S. Patent   Apr. 29, 1980   4,200,536
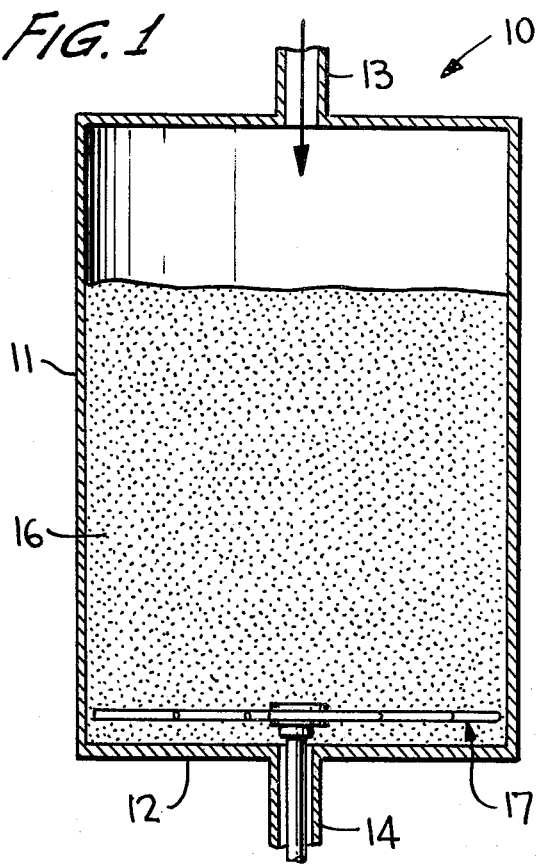
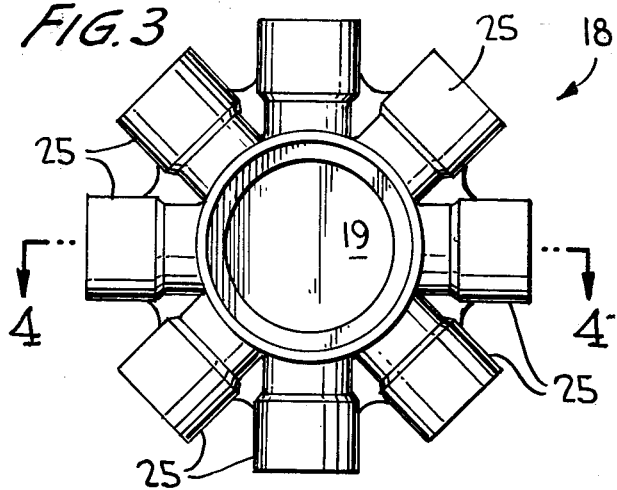
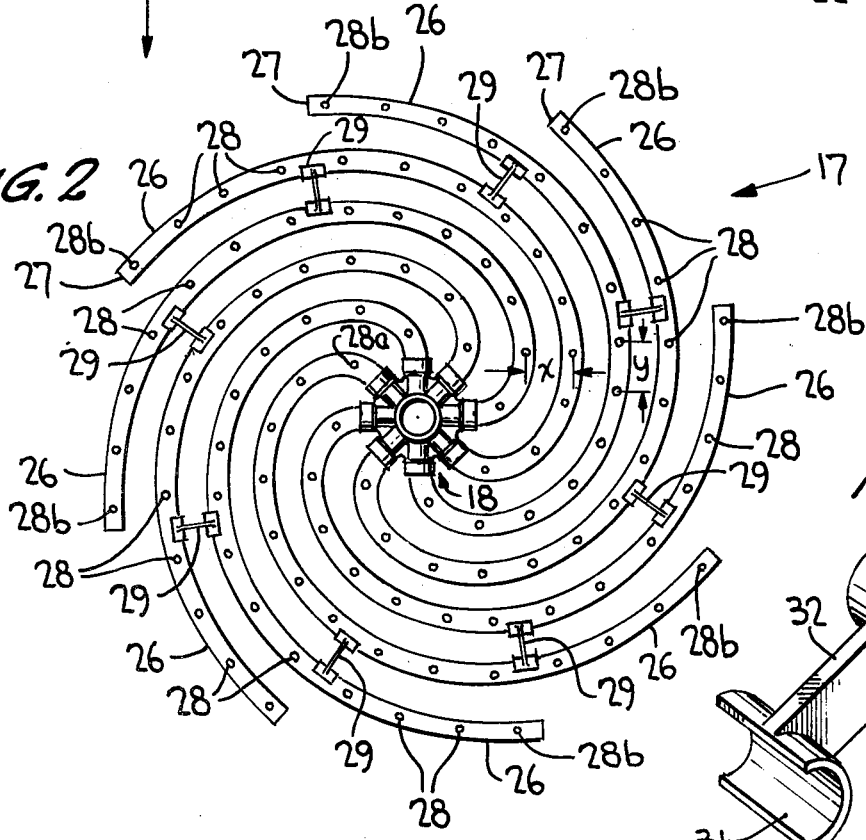
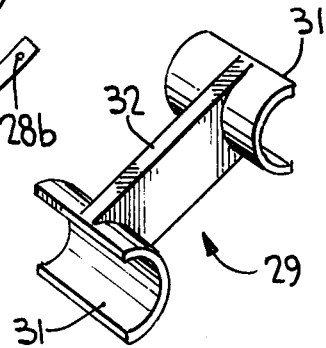

UNDERDRAIN FOR FILTER TANKS

BACKGROUND OF THE INVENTION

This invention relates generally to sand filters, and more particularly to an underdrain assembly for such a filter designed to uniformly and completely distribute backwash water through the filter bed during the backwashing operation.

Sand filters, as known in the art, include filter beds of sand requiring frequent backwashing to free the beds from sludge or other material collected from the water. The backwashing operation is normally carried out by the introduction of clear water below the filter bed under sufficient pressure to thoroughly churn-up the sand and wash out the sludge.

It has been found that underdrains currently used in sand filters for the filtering and backwashing operations fail to uniformly distribute the backwashed water through the sand filter. Dirt or sludge therefore accumulates in the sand bed in those areas where a sufficient supply of backwash water is not made available. Two basic types of underdrains are currently in use, although both have inherent shortcomings.

One type employs a perforated disc and sometimes a cloth-covered plastic disc. The pressure at the top of the disc will vary up to 20 psi during the filter cycle, although the pressure beneath the disc is always less because of the unrestricted flow available to the effluent. While filtering, the pressure forces the sand against the perforations thereby causing a substantial blocking of each opening. Thus, the perforations must be of sufficient number and size to permit an adequate amount of filtered water to pass therethrough regardless of any obstructions formed in the openings. Adequate filtration is therefore made possible, but problems begin with such a filter is backwashed. During backwash, when the water flow is reversed through the underdrain, the perforations thereof are cleared of all obstructions so that water is free to flow through the openings although without any precise control. Naturally, those openings nearest the inlet supplying the incoming water will receive a larger flow than those openings remote from such inlet supply. The result is an uneven flow of water upwardly through the sand bed. Those portions of the filter bed that receive the greater flow will therefore be cleaned more rapidly than those areas where the flow is less. Also, some portions of the filter bed never get backwashed and, as the sand filter ages, its effectiveness is substantially reduced. Another defect of such a filter is that some of the dirt or sludge that had not been backwashed out but was nevertheless dislodged from the sand particles is washed back into the pool when the filter is returned to its filtering position.

Another type of underdrain employs a system including a centrally located hub with straight hollow tubes, having perforations or slits in the periphery, radially projecting from the hub. The problem with such system is that as the tubes extend further from the hub the distance between adjacent tubes increases so that the flow of water through the underdrain during the backwashing operation is greater near the hub and almost non-existant near the outer perimeter of the filter tank. Such a system is therefore incapable of effecting a uniform backwashing operation since a large portion of the sand bed near the outer perimeter of the underdrain receives practically no backwash.

SUMMARY OF THE INVENTION

It is therefore an object of the present invention to provide an underdrain for sand filters which costs no more to produce than other underdrains yet effects a uniform distribution of backwash water through the filter bed, in a simple and efficient yet highly effective manner.

In carrying out this objective the underdrain assembly according to the present invention includes a central hub defining a chamber having sleeves radially extending therefrom and elongated hollow tubular elements extending outwardly of the sleeves. These elements have capped terminal ends, equally spaced perforations in the lower sides thereof, are of equal length, are spirally shaped and are equally spaced apart with their perforations being of equal size so that the perforations of adjacent tubular elements are equally spaced apart from the central hub to the outer periphery of the underdrain. Thus, the backwash water fed through the underdrain assembly is thereby distributed during the backwashing operation substantially uniformly through the filter bed so that the entirety of the filter bed is completely and uniformly backwashed.

Other objects, advantages and novel features of the invention will become more apparent from the following detailed description of the invention when taken in conjunction with the accompanying drawings.

BRIEF DESCRIPTION OF THE DRAWINGS

FIG. 1 is a vertical sectional view of a sand filter tank including an underdrain assembly according to the invention;

FIG. 2 is a bottom view, at a slightly enlarged scale, of the underdrain assembly according to the invention;

FIG. 3 is a top plan view, at a slightly enlarged scale, of the central hub of the FIG. 2 underdrain assembly;

FIG. 4 is a sectional view of the central hub taken substantially along line 4—4 of FIG. 3; and FIG. 5 is a perspective view of one of the spacer elements used in maintaining an equal spacing between adjacent tubular elements of the underdrain assembly.

DETAILED DESCRIPTION OF THE INVENTION

Turning now to the drawings wherein like reference characters refer to like and corresponding parts throughout the several views, an upright cylindrical filter tank 10 is shown in FIG. 1 as having a cylindrical side wall 11 and a substantially horizontal bottom wall 12. An inlet 13 for the effluent to be filtered is provided at the top of the tank, and an outlet 14 for the filtered liquid is provided in bottom wall 12. A filter bed 16 of sand partially fills the tank to some predetermined level, and functions as a filter in a manner known in the art.

The underdrain assembly according to the invention is generally designated 17 and lies near bottom wall 12 within the filter bed. As shown in more detail in FIGS. 2 to 5, assembly 17 includes a central hub 18 (FIGS. 3 and 4) having upper and lower walls 19 and 21 spaced apart to form a chamber 22 therebetween. An outlet sleeve 23 depends from lower wall 21 and openly communicates with the chamber through a bore 24 provided in the lower wall. A plurality of sleeves 25 are equally spaced apart and extend radially outwardly of walls 19 and 21 in open communication with chamber 22.

A plurality of elongated hollow tubular elements 26 are connected at their inner ends to sleeves 25 and extend outwardly of the central hub so that their terminal ends, capped as at 27, lie adjacent the inner surface of cylindrical wall 11. Tubular elements 26 lie parallel to bottom wall 12, are equally spaced apart throughout their length and are each of a spiral configuration lying substantially parallel to one another. Each of the tubular elements has a plurality of perforations 28 in the lower sides thereof which are equally spaced from each other from a first of such perforations 28a to the last of such perforations 28b in each element. The perforations are directed downwardly so that there is no tendency for the sand particles to be pushed against the perforations to block any of them off. And, first perforations 28a of each tubular element are equally spaced from sleeve 23 of the central hub a distance equal to the spacing between perforations 28. The tubular elements are maintained equally spaced apart by means of a plurality of spacers 29 of equal length having cups 31 at opposite ends of a bar 32, the cups receiving sides of adjacent tubular elements and being secured thereto in any normal manner.

With such an underdrain assembly it can be seen that perforations 28 between adjacent tubular elements are equally spaced apart from the central hub to the outer periphery of the assembly. Thus, with a predetermined numbered of perforations of a predetermined equal size having a predetermined pressure of water flowing through each perforation during the backwashing operations, it is possible to precisely control and predict the amount of back flow water flowing through the perforations. The complete backwashing of the entire sand filter bed is therefore made possible so that no portion of the filter bed will take a longer time or more water than any other portion thereof during the backwashing operation. Distances x between perforations of adjacent tubular elements 26, and distances y between perforations in each tubular element are capable by the present invention of being made substantially equal to one another so as to effect an even distribution of the backwash water through the entirety of the sand filter bed. It can be seen that such an even distribution is accomplished by means of a simply constructed and arranged underdrain assembly which is likewise economical, and easy to manufacture and assemble.

Obviously, many modifications and variations of the present invention are made possible in the light of the above teachings. It is therefore to be understood that within the scope of the appended claims the invention may be practiced otherwise than as specifically described.

I claim:

1. In a filter system having an underdrain assembly facilitating a backwashing operation, a tank having a cylindrical side wall and a substantially horizontal bottom wall, a bed of filtering material contained in said tank, said assembly being located within said tank near said bottom wall, said assembly comprising a central hub having spaced upper and lower walls defining a chamber therebetween, an outlet sleeve in open communication with said chamber through said lower wall and extending outwardly of said bottom wall, a plurality of radially extending sleeves in open communication with said chamber from between said upper and lower walls, a plurality of elongated and hollow tubular elements connected to said radially extending sleeves and in open communication with said chamber, said elements having capped terminal ends and lying parallel to said bottom wall, said tubular elements being spirally shaped between opposite ends thereof and lying parallel to one another and equally spaced apart between said opposite ends, said elements being of substantially equal length and said terminal ends lying closely adjacent said cylindrical side wall, and said elements having perforations of equal size in lower sides thereof, a first of said perforations of each said elements being spaced first equal distances from inner ends of said elements, the remainder of said perforations being uniformly spaced in said elements from said first perforations thereof so that said perforations in adjacent elements are equally spaced apart from said central hub to the outer periphery of said assembly, whereby backwash water fed through said outlet sleeve and out through said perforations is distributed during the backwashing operation substantially uniformly through said filter bed so that the entirety of the filter bed is completely and uniformly backwashed.

2. The filter system according to claim 1, wherein spacers of equal length span said adjacent elements for maintaining said elements spaced equally apart.

* * * * *